United States Patent [19]

Sydenstricker

[11] Patent Number: 5,749,320

[45] Date of Patent: May 12, 1998

[54] FISH AQUARIUM BACKGROUND DEVICE AND METHOD FOR PROVIDING

[76] Inventor: Anita S. Sydenstricker, 4613 Camp Creek Dr., Huntington, W. Va. 15026

[21] Appl. No.: 789,746

[22] Filed: Jan. 27, 1997

Related U.S. Application Data

[60] Provisional application No. 60/016,415, Apr. 29, 1996.
[51] Int. Cl.⁶ ................................................ A01K 63/00
[52] U.S. Cl. ............................................................ 119/253
[58] Field of Search ............................... 119/253, 257, 119/256; 40/594, 595

[56] References Cited

U.S. PATENT DOCUMENTS 3,763,997  10/1973  Willinger et al. ............... 119/253 X
3,849,913  11/1974  Williams, Sr. ..................... 40/594 X
5,090,357  2/1992  Pucci ................................. 119/256

FOREIGN PATENT DOCUMENTS 494364  10/1938  United Kingdom ................. 40/595

*Primary Examiner*—Jeffrey A. Smith
*Attorney, Agent, or Firm*—James L. Sherman

[57] ABSTRACT

An aquarium background device includes at least one thin sheet of plastic material adapted to be used in conjunction with a clear liquid to adhere to the outside surface of the rear glass wall of the aquarium in a manner that insures that the images and colors thereof will be vividly seen from the front of the aquarium but can be easily removed and replaced with different background devices when desired.

19 Claims, 2 Drawing Sheets

FISH AQUARIUM BACKGROUND DEVICE AND METHOD FOR PROVIDING

BACKGROUND OF THE INVENTION

This application has been filed claiming priority under provisional application No. 60/016,415, filed on Apr. 29, 1996 and entitled FISH AQUARIUM BACKGROUND DEVICE.

1. Field of the Invention

This invention relates to fish aquarium background devices and, more specifically, to such background devices that adhere to the outside surface of the rear glass wall of the aquarium in a manner that insures that the images and colors thereof will be vividly seen from the front of the aquarium but can be easily removed and replaced with different background devices when desired.

2. Brief Description of the Prior Art

While there are currently available countless decorative items and elements that can be installed within fish aquariums to create an aquatic scene or atmosphere, there appears to have been less consideration given to the appearance of the rear of the aquarium as it would appear from the front of the aquarium. In most cases, the appearance through the aquarium is dictated by the location of the aquarium, whether it is against a wall or window, and the objects or elements positioned behind the aquarium.

It might appear that one could simply create a desired background for the aquarium, which is consistent with the scene or atmosphere within the aquarium, by attaching a picture or the like to the rear glass which could be seen from the front. However, the use of a photograph or picture which is glued or taped against the rear glass has not been found to create an attractive or desired results. Since the photograph or picture would not be transparent or translucent, any light source from the rear of the aquarium would be blocked or reduced to decrease the background lighting within the aquarium to the extent that it could make viewing the fish or scene within the aquarium more difficult and less enjoyable. It should be noted that most aquariums have some type of top or over head fluorescent lighting to improve the viewing of the fish or scene within the aquarium. The use of the light above the surface of the aquarium tends to make the interior of the aquarium glow but has a detrimental effect on the viewing of the rear glass surface. The light tends to reflect off the inside surface at the inside of the rear glass and, because of the light reflective characteristics of sheet glass, it may even reflect off of the inside of the outside surface of the rear sheet of glass. The reflective characteristics of glass is such that light from one side of the glass will be defused and, at least partially, reflected at each of the surfaces of the sheet of glass. As a results, any photograph or picture which is simply placed or positioned against the rear surface of the aquarium will not be effectively lighted or seen from the front. Front or top lighting will not be effectively transmitted to the surface of the photograph or picture and the image on the photograph or picture will not be effectively transmitted back though the two surfaces of the rear glass for proper viewing from the front.

There are currently available through pet stores and the like a background device sold by Penn-Plax, 720 Stewart Ave., Garden City, N.Y., in sheet or roll form that can be taped to the back of the aquarium. One form of this background device is available in five different sheets with a different scene on each of the opposite sides of each sheet. Clearly, with a different picture or scene on each side, the background device is not transparent or translucent and, since the device is to be taped to the back surface of the rear glass, the light diffusion and reflection is such that the image on the device can not be effectively viewed from the front.

In an attempt to offer an alternative background device, a new type of rubbery background device, sold under the trademark PETSCAPE, appears to have only been offered in a non-transparent, dark green color to have some of the same problems discussed above. However, one surface is provided with some type of reusable adhesive and must be sold with a thin plastic cover sheet over the adhesive side to prevent anything from being inadvertently stuck to the surface. After the cover sheet is removed, the adhesive can be stuck directly to the rear surface of the glass. Initial alignment and/or repositioning is complicated because of the possibility of the adhesive being initially stuck to the surface in an incorrect position. To insure that air bubbles between the rubbery device and the glass are removed, the back surface of the device should be squeegeed with a scrapping device. While the use of a squeegee does remove some of the air pockets or bubbles formed between the rear surface of the glass and the rubbery device, the squeegeeing is made more difficult by the adhesive on the surface of the rubbery device. Although the reason is not given, it is suggested that water can be added to the sticky, adhesive surface when the background device is initially being applied to the surface of the rear glass. It is not clear if the water is intended to make application easier but, in any case, it has been found that subsequent removal after the use of the water is much more difficult.

For a completely different purpose, there have also been provided small two-sided decals for installation on the rear glass of fish aquariums. These decals are not expected to cover the entire area or to provide an overall background effect. While they may produce a relatively clear image when viewed from the front of the tank, the process for applying the decal is such that those which are selected can not be easily removed or changed.

U.S. Pat. No. 2,144,551 includes a wall aquarium that has a means for mounting a picture at the back thereof. Although there is indication that the pictures may also be painted directly on the transparent receptacle, or painted on both the transparent receptacle and on the picture slide, there is no suggestion of any means for providing a configuration that can be clearly or brightly seen from the front but can be conveniently changed.

U.S. Pat. No. 2,814,895 discloses a simulated porthole or opening that has a light, a vessel with water and a picture at the backside thereof. However, again there is no suggestion that the picture will be held against the surface in a manner that will assure that there are no air bubbles or gaps therebetween.

U.S. Pat. No. 3,119,371 discloses a mirror device having an image on one side thereof which is to be held against the back glass of a fish tank but there is no suggestion that the image will be brought into such full contact with the glass by any means that will insure that there are no air gaps or spaces therebetween.

U.S. Pat. No. 3,121,417 discusses that there had previously been provided pictures of a two-dimensional character such as a decalcomania paper containing an adhesive film over the front of the picture for pasting it to the outer rear wall of a tank in order to simulate a scene or add an ornamental effect. However, there is no suggestion of how such a decal can be removed or changed to provide a different image. In any case, the preferred embodiment of the invention taught in U.S. Pat. No. 3,121,417 includes a three-dimensional structure that could not be brought into direct contact with the entire glass surface and would have the diffusion and reflection problems discussed above.

U.S. Pat. No. 4,136,638 has a wall mounted aquarium having a slot, which is displaced from the back glass of the tank, for the receipt of a picture therein. This arrangement would allow the pictures to be changed but have the disadvantages associated with the spacing between the picture and the glass discussed above.

U.S. Pat. No. 5,090,357 discloses various transparent and mirrored plates that can be inserted into an aquarium to provide a three-dimensional appearance.

U.S. Pat. No. 5,090,358 includes a elaborate aquarium or terrarium vessel that has a back picture feature that allows the image thereon to be seen through the vessel. The configuration includes a slot for placement of background scene having length and height dimensions of an integrated picture vessel. The width of the slot is designed to be roughly two millimeters. The background scene can be changed as often as desired by simply pushing it out through an access opening, along rail surfaces, until it can be grasped as it emerges from either end of slot. There is no suggestion of direct contact with the surface of the back glass which would be desirable for effective use in a fish aquarium because of the lighting and the diffusion and reflective conditions that exist.

For a different purpose and effect, window decoration devices have been provided under the trademark Classic Clings by Impact Plastics Advertising, Inc., 223 Southeast 1st Ave., Clara City, Minn. The devices are typically relatively small, are shaped according to the design shown thereon and would not be expect to cover the entire rear glass of an aquarium. The devices have a smooth side with the opposite side having a slightly raised, "painted" area. The decoration devices are to be installed on the inside of the windows with the smooth side toward the glass and appear to be simply held in position by the "vacuum" formed between the smooth surface and the glass or by static electricity. Of course, such devices will not remain on the surface of a rear glass of an aquarium because of the controlled temperatures of the aquarium water and the moisture that tends to form on the outer surfaces of the glass. It is also unclear if the image that appears satisfactory for use on a window would be acceptable on an aquarium that has different lighting, diffusion and reflective characteristics.

SUMMARY OF THE INVENTION

It is an object of the present invention to provide a fish aquarium background device that can be simply and easily applied to the rear glass of the aquarium.

It is another object to provide such a background device that includes at least a portion which is transparent to allow light from the rear of the aquarium to be seen therethrough.

It is still another object to provide such a background device which will adhere to the surface of the rear glass without any air bubbles or air gaps therebetween that would interfere with a clear, bright view of the images or pictures thereon despite the existence of the special lighting, diffusion and reflection characteristics that occur in a fish aquarium.

It is yet another object to provide such a background device that can be easily removed and replaced with a similar such device without destroying the original background device or adversely affecting the outer surface of the rear glass.

These and other objects of the invention are provided in a preferred embodiment thereof including an aquarium background device for being used in conjunction with a clear liquid for installation on the outside surface of the rear glass of an aquarium for viewing through the aquarium from the front thereof. The rear glass has a predetermined width and a predetermined height. The background device includes a thin sheet of plastic material which has dimensions corresponding to the predetermined width and the predetermined height for overlying the outside surface of the rear glass. The sheet has a first side having a nonadhesive surface. The sheet of plastic material is impervious for being disposed with the first side toward the outside surface to be capable of initially entrapping the clear liquid liberally applied to the outside surface therebetween. The sheet of plastic material is flexible to be capable of being squeegeed to remove an excessive portion of the clear liquid from between the first side and the outside surface to decrease a distance therebetween and to cause a remaining portion of the clear liquid to be able to fill any areas of greater separation between the first side and the outside surface. The sheet has a first image area for being viewed at the first side of the sheet and for being clearly seen through the rear glass and the remaining portion of the clear liquid when the sheet is installed on the rear glass. The sheet is capable of adhering to the outside surface of the rear glass by the remaining portion of the clear liquid being entrapped therebetween and of being selectively removable when the sheet is caused to be separated from the outside surface to allow the remaining portion of the clear liquid to escape from therebetween.

The aquarium background device can further include the sheet having at least a portion which is translucent for allowing light from a source at the rear of the aquarium to be transmitted through the portion for illumination thereof when the sheet is installed on the rear glass. The sheet can also include a second side having a nonadhesive surface opposite the first side. The device can include an additional sheet of plastic material which is dimensioned, impervious and flexible like the sheet. The additional sheet has a first side having a nonadhesive surface for being disposed toward the second side of the sheet to be capable of entrapping additional clear liquid therebetween for adhering to the sheet. The additional sheet includes an additional image area thereon which is capable of being aligned with the portion of the sheet which is translucent for being clearly seen through the rear glass, the clear liquid, the portion of the sheet and the clear liquid when the additional sheet is installed on the sheet.

The preferred device can further include the sheet having a second side with a nonadhesive surface opposite from the first side and further includes a second image area on the sheet for being viewed at the second side of the sheet. The second image area is different from the first image area and the second side is for being selectively, alternatively disposed toward the outside surface for installation of the sheet on the rear glass in the same manner as with the first side toward the rear glass. The first image area and the second image area can include opaque regions to prevent light from the source from passing through the opaque regions.

The preferred aquarium background device can further include a thin insert sheet of plastic material which is impervious and flexible like the sheet and is dimensioned to be smaller than the sheet. The insert sheet is for being installed with the clear liquid against the first side of the sheet prior to the sheet being installed on the outside surface of the rear glass. The insert sheet has a discrete image thereon for being selective positioned on the first side relative to the first image area of the sheet when the sheet is installed on the outside surface.

One embodiment of the preferred aquarium background device for installation on the outside surface of the rear glass of an aquarium can include the clear liquid and the clear liquid is preferably at least one of water and petroleum jelly.

Yet another embodiment of the invention includes a method of providing an aquarium background at the outside surface of the rear glass of an aquarium for viewing through the aquarium from the front thereof. The method includes the steps of: liberally applying a clear liquid to the outside surface of the rear glass; providing a thin sheet of plastic material with a first side having a nonadhesive surface thereon and the sheet having a first image area f or being viewed at the first side; installing the sheet with the first side on the outside surface while initially entrapping the clear liquid therebetween; squeegeeing the sheet toward the outside surface to remove excess clear liquid from between the first side and the outside surface to leave some of the clear liquid therebetween; and the step of squeegeeing reduces a distance between the first side and the outside surface, causes some of the clear liquid to fill any areas of greater separation between the first side and the outside surface, and causes the sheet to adhere to the outside surface until being selectively removed by the sheet being separated from the outside surface to allow some of the clear liquid to escape from therebetween.

The preferred method can further include the steps of: providing the sheet with a second side having a nonadhesive surface opposite the first side; providing at least a portion of the sheet of plastic material which is translucent for allowing light from a source at the rear of the aquarium to be transmitted through the portion; providing an additional sheet of plastic material like said sheet, which additional sheet has a first side with a nonadhesive surface and an additional image area for being viewed at the first side thereof; liberally applying additional clear liquid to the second side of the sheet; installing the additional sheet with the first side of the additional sheet on the second side of the sheet with the additional image area thereof generally aligned with the portion of the sheet while initially entrapping the additional clear liquid therebetween; squeegeeing the additional sheet toward the second side of the sheet to remove excess additional clear liquid from between the second side of the sheet and the first side of the additional sheet while leaving some of the additional clear liquid therebetween; and the step of squeegeeing the additional sheet reduces a distance between the second side of the sheet and the first side of the additional sheet, causes some of the additional clear liquid to fill any areas of greater separation between the second side of the sheet and the first side of the additional sheet, and causes the additional sheet to adhere to the second side of the sheet until being selectively removed by the additional sheet being separated from the second side of the sheet to allow some of the additional clear liquid to escape from therebetween.

The preferred method can further include, prior to the liberally applying the clear liquid to the outside surface of the rear glass and installing the sheet with the first side on the outside surface, the steps of: providing a thin insert sheet of plastic material like the sheet with dimensions smaller than the sheet, which insert sheet has a first side and a second side having nonadhesive surfaces; initially applying a small quantity of the clear liquid to the first side of the sheet; installing the insert sheet with the second side of the insert sheet on the first side of the sheet while initially entrapping the small quantity of the clear liquid therebetween; squeegeeing the insert sheet toward the first side to remove an excess of the small quantity of the clear liquid from between the second side of the insert sheet and the first side of the sheet to leave some quantity of the clear liquid therebetween; wherein the step of installing the sheet on the outside surface also entraps the insert sheet therebetween, with the first side of the insert sheet toward the outside surface of the rear glass, prior to the squeegeeing of the sheet to cause the sheet to adhere to the outside surface.

The preferred method of providing an aquarium background at the outside surface of the rear glass of an aquarium for viewing through the aquarium from the front thereof can further include the step of providing the clear liquid which is at least one of water and petroleum jelly.

DETAILED DESCRIPTION OF THE PREFERRED EMBODIMENTS

Figure 1:
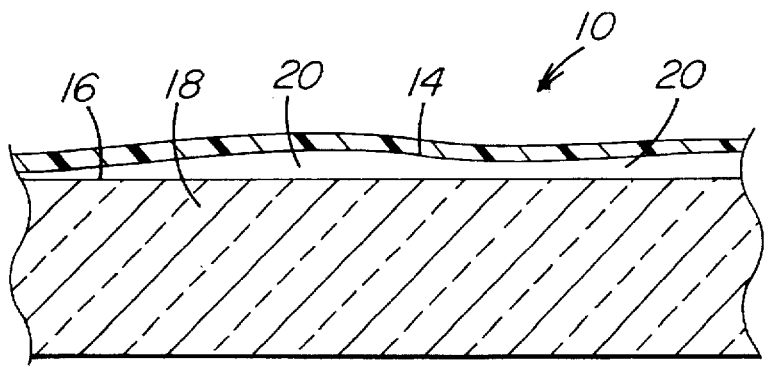
FIG. 1 is a cross-sectional view of a rear glass of an aquarium and the preferred background device as initially positioned thereon including various features of the invention.

As seen in FIG. 1, the preferred background device 10 is made of thin sheet plastic material that is flexible but durable. The thickness of the sheet plastic material should be greater than that of sealable plastic food wrap which tends to be too thin and too flexible since it will readily bend back on and stick to itself to form wrinkles that are very difficult to remove. The thickness and flexibility of the window decorative devices discussed above is generally that which can be employed for the present invention. It is believed that, for the larger devices that cover the entire rear glass of an aquarium, the thickness should be greater than one mil and less than ten mils. It is possible that sheets that are thicker but still have a smooth surface and are flexible enough for proper alignment with the rear glass could be used. The sheets can be provided in roll form to be cut as desired but, since numerous scenes or pictures may be provided, it is expected that most background devices will be in sheet form with length and height dimensions generally corresponding to the dimensions of the rear glasses of various sizes of standard aquarium. The standard dimensions of the sheets may be slightly enlarged so that the user can trim the edges to match the particular aquarium to which it is to be installed.

Figure 2:
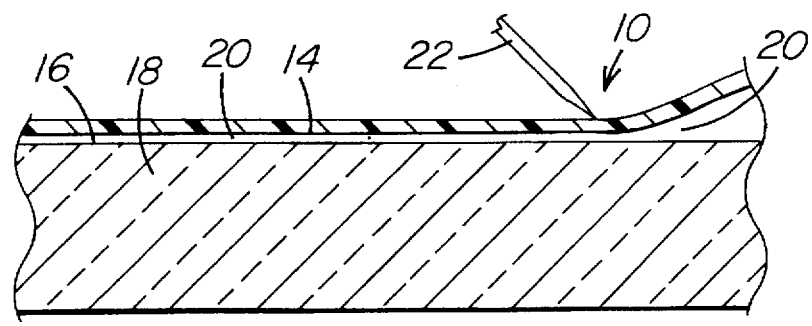
FIG. 2 is a cross-sectional view like that of FIG. 1 with the preferred background device being installed on the rear glass.

As demonstrated in FIGS. 1 and 2, the background device 10 is to be installed on a fish aquarium 12 with one surface 14 of the device 10 being brought into general contact with the outer, rear surface 16 of the rear glass 18 of the aquarium 12. Initially, a clear liquid 20, such as water, is liberally applied to the outer surface 16 and the one surface 14. When the device 10 is aligned with the rear glass 18, the liquid 20 is entrapped between the surfaces 16, 14. To remove the excess liquid 20 and to bring the surfaces 16, 14 into as close contact as possible with only a small quantity of liquid 20 therebetween, a hard surfaced squeegee 22 is used on the other surface 34 of the device 10 to displace the liquid 20 toward the edges of the device 10 and rear glass 18. All of the liquid 20 is not removed. The liquid 20 that remains is expected to fill in slightly raised areas that would otherwise contain air bubbles. It has been found that the liquid 20 tends to displace any air in a non-compressive or expansive manner. The "surface tension"0 of the liquid 20 tends to draw the two surfaces 16, 14 together and to prevent air from passing between the surfaces 16, 14 to allow their separation.

However, more significantly, the liquid 20 tends to allow the images or pictures on the background device to be better seen through the rear glass 18 and from the front of the aquarium 12. It is felt that the liquid 20 being in contact with both surfaces 16, 14 allows the light to transmit directly though the rear glass 18 and to prevent any undesired reflection at the outside surface 16 which diffuses or interrupts the light rays from the surface 14. The images and pictures on the background device 10 tend to "glow" and are even enhanced by the top aquarium light which has been found to be detrimental when viewing prior art background devices that are separated from the outer surface 16 or even adhered thereto by other forms of adhesive. Consequently, using the liquid 20 on the surfaces 16, 14, which have no other adhesive thereon, simplifies positioning and application, allows easy removal for replacement with a different background device when desired, and enhances the view from the front of the aquarium 12 when compared to other types of background devices of the prior art.

While the preferred liquid 20 is water, other clear liquids might be employed for the same general purpose and effect. Water is generally preferred for use between the smooth surface 14 and the glass surface 16 because of its ease of availability and ease of "cleaning" when an excessive amount is employed. Additionally, when a particular background device is to be replaced with a different background device, it is expected that the first background device will not be discarded but simply saved for use at a future date. Clearly, the water would not remain on the surface of the device after removed and would not prevent it from being effectively stored for later use. However, it has been found that there is some evaporation over time and the simple application discussed above may have to be repeated if too much time passes prior to removal for the application of a different background device. As a result, it has been found that clear petroleum jelly can be used as one alternative liquid 20 for the application of the device 10 to the rear glass 18. Although the petroleum jelly may be slightly messier than water when changing or replacing the background device 10, it does not tend to evaporate and lasts a significantly longer time without having to be renewed. There may also be other clear liquids that could be employed that do not tend to evaporate but do not have adhesive characteristics which would interfere with removal of the background device from the rear glass and its subsequent storage for later possible use.

Figure 3:
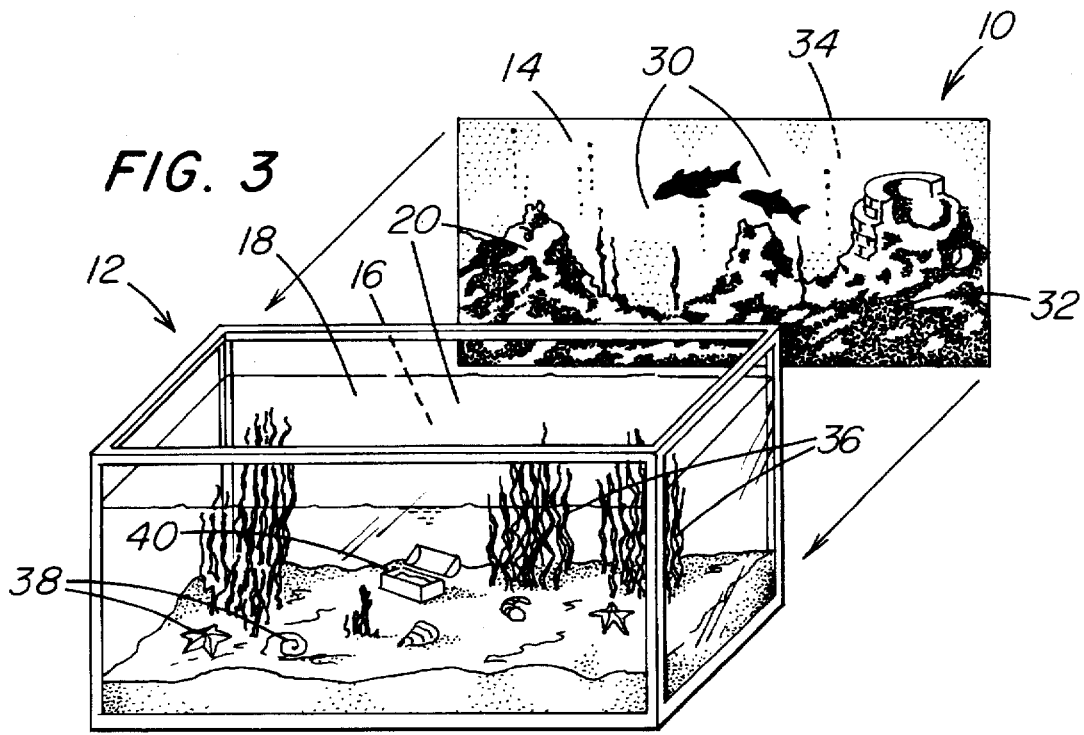
FIG. 3 is an isometric view of a fish aquarium demonstrating how a preferred background device is to be installed thereon.

As seen in FIG. 3, one embodiment of the invention includes a preferred background device 10 that has a scene or picture thereon to enhance the overall view from the front of the aquarium 12. Using the same material and physical characteristics, any number of scenes or pictures could be provided for the selection of the aquarium owner. Since most aquarium installations would expect to have some form of back lighting, the preferred background device 10 includes at least a portion 30 thereof that is translucent to allow lighting from the rear. Another portion 32 of the background device 10 might be opaque to prevent the transmission of light therethrough. Consequently, it would be possible for the opaque portion 32 on the back surface 34 to have an identical but reversed image as is on the front surface 14 as seen in FIG. 3. With such an arrangement, there would be a smooth side with no "painted" area thereon and an opposite side with a slightly raised, "painted" area that can be seen from either side 14, 34 of the device. Although this may appear to be similar to the window decorations discussed above, the use of a liquid 20 would allow either side 14 or 34 to be turned toward the outer surface 16 of the rear glass 18. While water can be used for either side 14, 34, the retention is significantly longer when the petroleum jelly is used for the raised side. Accordingly, the user may selectively use one view or a reversed view, depending on the arrangement and location of various artificial plants 36, shells 38 or other decorative items 40 installed within the interior of the aquarium 12.

Additionally, because of the inability of light to pass through the opaque portion 32, it would be possible with proper alignment of the designs to include different "painted" images on the opposite side 14, 34. The user would then be able to use the same device 10 but could select one of two entirely different views and effects depending on which side 14, 34 is placed against the surface 16. Although it is not expected to be the preferred arrangement, it might be determined that there is a need for such background devices that will be installed on aquariums 12 which will have no back lighting or for which no back lighting is desired. In such a case, the entire background device might be opaque and a completely different image or picture could be provided for each side.

Figure 4:
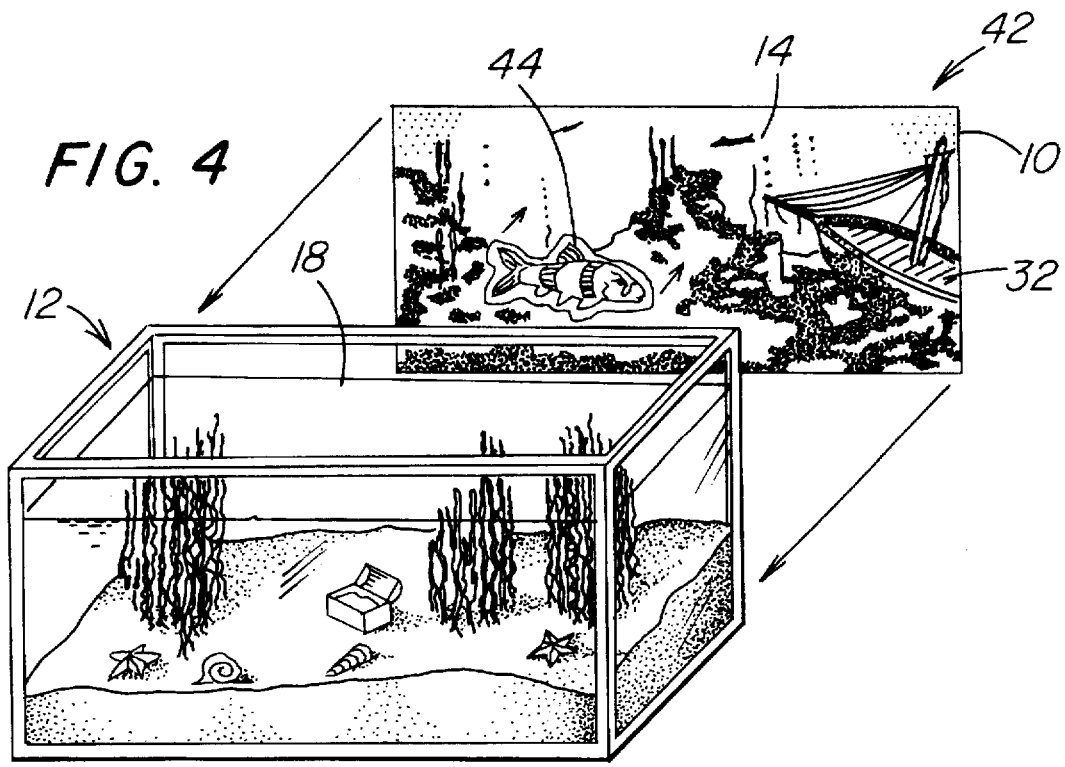
FIG. 4 is an isometric view of the fish aquarium of the FIG. 3 with alternative background devices to be installed thereon.

To provide further design alternatives for the user, as seen in FIG. 4, another embodiment of the invention includes an arrangement 42 that includes a background device 10 and a selective insert 44. The insert 44 might be in the form of a large fish, shark, diver, sunken wreck, etc. that can be selectively positioned on the surface 14 of the background device 10 to produce a three-dimensional effect that is "created" by the user prior to installation on the rear glass 18. The insert 44, which may also be reversible, may be made of sheet plastic which has a thickness that is less than the background device 10 and comparable with that of the sealable plastic food wrap material discussed above. The smaller piece of very thin material forming the insert 44 would be easier to handle and easier to smooth out on the surface 14 of the background device 10. Again, the liquid 20 could be used between the insert 44 and the surface 14 of the background device 10 to assist in the adherence of the insert 44 thereon prior to both being installed on the rear glass 18. It has been found that, with the use of a relatively thick insert 44 and the liquid 20 being water, there is the possibility to leave a slight gap in an encircling area around the insert 44 which does not effectively transmit the light rays in the normal "glowing" manner. Consequently, for the arrangement 42, it is desirable for the insert 44 to be as thin as possible or the liquid 20 to be petroleum jelly or some other liquid that better fills and remains in the gaps around the image 44 to insure that the light is uniformly transmitted through the rear glass.

Figure 5:
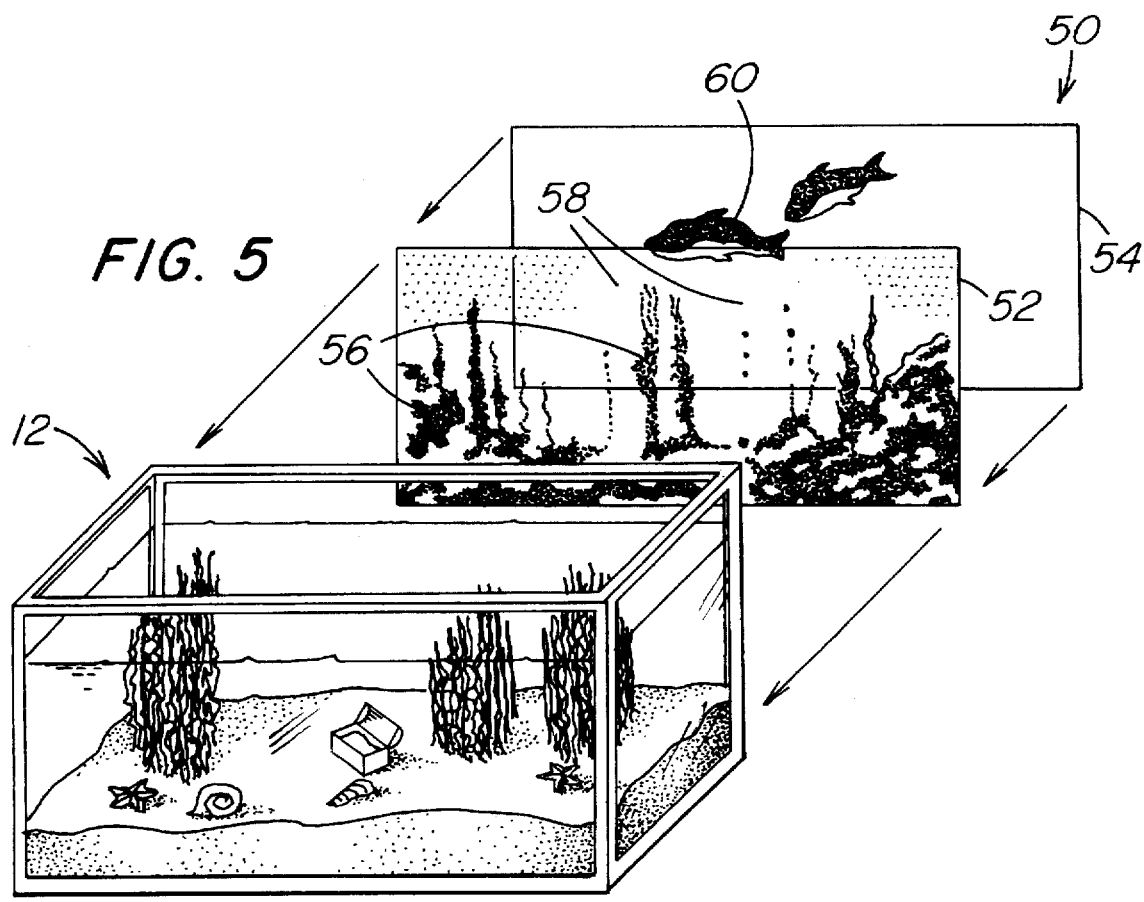
FIG. 5 is an isometric view of the fish aquarium of the FIG. 3 with other alternative background devices to be installed thereon.

As seen in FIG. 5, yet another arrangement 50 includes two background devices 52 and 54, one to be placed in front of the other, which could respectively have reversible images on the opposite sides thereof. The first, front device 52 may have some areas 56 that are translucent or even opaque but, more significantly, has a large area 58 that is, by and large, transparent. The area 58 could alternatively be entirely clear, could be tinted or could even include a variety of colors and shades to create, for example, a hazy, diffused underwater effect. In any case, an object or image positioned behind the area 58 could be seen therethrough. The rear background device 54 would be primarily transparent with specific opaque decorative features or elements 60 added for being selectively aligned with and positioned in the large areas 58 of the device 52. While the preferred background device 54 covers the entire area of rear glass 18, it has been found that smaller elements or features 60, similar to the insert 44, could also be selectively positioned and installed on the back of the front device 52. The petroleum jelly would be the preferred liquid 20 for adherence between the surfaces of the first background device 52 and the device 54. If desired, the positions of the devices 52, 54 relative to the rear glass 18 could be reversed to produce a different three-dimensional effect.

It is clear from the preferred embodiments discussed above that numerous scenes and effects can be designed and created by the user. The various background devices and other elements or features can be easily installed and changed as desired. While the specific embodiments shown in the figures tend to include conventional under water scenes and elements, there would be nothing to prevent the use of more impressionistic scenes or paintings such as seascapes in the style of Van Gogh or Monet. Any number of alterations could be made to the preferred embodiments without departing from the scope of the invention as claimed.

What is claimed is:

1. An aquarium background device for being used in conjunction with a clear liquid for installation on the outside surface of the rear glass of an aquarium for viewing through the aquarium from the front thereof, the rear glass having a predetermined width and a predetermined height, said background device comprising:

a thin sheet of plastic material;

said sheet having dimensions corresponding to the predetermined width and the predetermined height for overlying the outside surface of the rear glass;

said sheet having a first side having a nonadhesive surface;

said sheet of plastic material being impervious for being disposed with said first side toward the outside surface to be capable of initially entrapping the clear liquid liberally applied to the outside surface therebetween;

said sheet of plastic material being flexible to be capable of being squeegeed to remove an excessive portion of the clear liquid from between said first side and the outside surface to decrease a distance therebetween and to cause a remaining portion of said clear liquid to be able to fill any areas of greater separation between said first side and the outside surface;

said sheet having first image means for being viewed at said first side of said sheet and for being clearly seen through the rear glass and the remaining portion of the clear liquid when said sheet is installed on the rear glass; and said sheet being capable of adhering to the outside surface of the rear glass by the remaining portion of the clear liquid being entrapped therebetween and of being selectively removable when said sheet is caused to be separated from the outside surface to allow the remaining portion of the clear liquid to escape from therebetween.

2. The aquarium background device according to claim 1, wherein at least a portion of said sheet of plastic material is translucent for allowing light from a source at the rear of the aquarium to be transmitted through said portion for illumination thereof when said sheet is installed on the rear glass.

3. The aquarium background device according to claim 2, wherein said sheet includes a second side having a nonadhesive surface opposite said first side and further including an additional sheet of plastic material which is dimensioned, impervious and flexible like said sheet, said additional sheet having a first side having a nonadhesive surface for being disposed toward said second side of said sheet to be capable of entrapping additional clear liquid therebetween for adhering to said sheet, and said additional sheet including additional image means thereon which are capable of being aligned with said portion of said sheet which is translucent for being clearly seen through the rear glass, the clear liquid, said portion of said sheet and the clear liquid when said additional sheet is installed on said sheet.

4. The aquarium background device according to claim 2, wherein said sheet includes a second side having a nonadhesive surface opposite from said first side and further includes second image means on said sheet for being viewed at said second side of said sheet, said second image means being different from said first image means and said second side for being selectively, alternatively disposed toward the outside surface for installation of said sheet on the rear glass in the same manner as with said first side toward the rear glass.

5. The aquarium background device according to claim 4, wherein said first image means and said second image means include opaque regions to prevent light from the source from passing through said opaque regions.

6. The aquarium background device according to claim 1, wherein said sheet includes a second side having a nonadhesive surface opposite from said first side and further includes second image means on said sheet for being viewed at said second side of said sheet, said second image means being different from said first image means and said second side for being selectively, alternatively disposed toward the outside surface for installation of said sheet on the rear glass in the same manner as with said first side toward the rear glass.

7. The aquarium background device according to claim 1, further including a thin insert sheet of plastic material which is impervious and flexible like said sheet and is dimensioned to be smaller than said sheet, said insert sheet for being installed with the clear liquid against said first side of said sheet prior to said sheet being installed on the outside surface of the rear glass and said insert sheet having a discrete image thereon for being selective positioned on said first side relative to said first image means of said sheet when said sheet is installed on the outside surface.

8. An aquarium background device for installation on the outside surface of the rear glass of an aquarium for viewing through the aquarium from the front thereof, the rear glass having a predetermined width and a predetermined height, said background device comprising:

a thin sheet of plastic material;

said sheet having dimensions corresponding to the predetermined width and the predetermined height for overlying the outside surface of the rear glass;

said sheet having a first side having a nonadhesive surface;

a clear liquid;

said sheet of plastic material being impervious for being disposed with said first side toward the outside surface to initially entrap said clear liquid therebetween;

said sheet of plastic material being flexible for being squeegeed to remove an excessive portion of said clear liquid from between said first side and the outside surface to decrease a distance therebetween and to cause a remaining portion of said clear liquid to be able to fill any areas of greater separation between said first side and the outside surface;

said first side of said sheet having first image means for being clearly seen through the rear glass and said remaining portion of said clear liquid when said sheet is installed on the rear glass; and said remaining portion of said clear liquid for causing said sheet to adhere to the outside surface of the rear sheet as it is entrapped therebetween and for allowing said sheet to be selectively removed when said sheet is caused to be separated from the outside surface to allow said remaining portion of said clear liquid to escape from therebetween.

9. The aquarium background device according to claim 8, wherein said clear liquid is at least one of water and petroleum jelly.

10. The aquarium background device according to claim 8, wherein at least a portion of said sheet of plastic material is translucent for allowing light from a source at the rear of the aquarium to be transmitted through said portion for illumination thereof when said sheet is installed on the rear glass.

11. The aquarium background device according to claim 10, wherein said sheet includes a second side having a nonadhesive surface opposite said first side and further including an additional sheet of plastic material which is dimensioned, impervious and flexible like said sheet, said additional sheet having a first side having a nonadhesive surface for being disposed toward said second side of said sheet to be capable of entrapping additional clear liquid therebetween for adhering to said sheet, and said additional sheet including additional image means thereon which are capable of being aligned with said portion of said sheet which is translucent for being clearly seen through the rear glass, said clear liquid, said portion of said sheet and said clear liquid when said additional sheet is installed on said sheet.

12. The aquarium background device according to claim 10, wherein said sheet includes a second side having a nonadhesive surface opposite from said first side and further includes second image means on said sheet for being viewed at said second side of said sheet, said second image means being different from said first image means and said second side for being selectively, alternatively disposed toward the outside surface for installation of said sheet on the rear glass in the same manner as with said first side toward the rear glass.

13. The aquarium background device according to claim 12, wherein said first image means and said second image means include opaque regions to prevent light from the source from passing through said opaque regions.

14. The aquarium background device according to claim 8, wherein said sheet includes a second side having a nonadhesive surface opposite from said first side and further includes second image means on said sheet for being viewed at said second side of said sheet, said second image means being different from said first image means and said second side for being selectively, alternatively disposed toward the outside surface for installation of said sheet on the rear glass in the same manner as with said first side toward the rear glass.

15. The aquarium background device according to claim 8, further including a thin insert sheet of plastic material which is impervious and flexible like said sheet and is dimensioned to be smaller than said sheet, said insert sheet for being installed with said clear liquid against said first side of said sheet prior to said sheet being installed on the outside surface of the rear glass and said insert sheet having a discrete image thereon for being selective positioned on said first side relative to said first image means of said sheet when said sheet is installed on the outside surface.

16. A method of providing an aquarium background at the outside surface of the rear glass of an aquarium for viewing through the aquarium from the front thereof, the method comprising the steps of:

liberally applying a clear liquid to the outside surface of the rear glass;

providing a thin sheet of plastic material with a first side having a nonadhesive surface thereon, said sheet having first image means for being viewed at said first side;

installing said sheet with said first side on the outside surface while initially entrapping said clear liquid therebetween;

squeegeeing said sheet toward the outside surface to remove excess said clear liquid from between said first side and the outside surface to leave some of said clear liquid therebetween; and said step of squeegeeing reduces a distance between said first side and the outside surface, causes said some of said clear liquid to fill any areas of greater separation between said first side and the outside surface, and causes said sheet to adhere to the outside surface until being selectively removed by said sheet being separated from the outside surface to allow said some of said clear liquid to escape from therebetween.

17. The method according to claim 16, further including the steps of:

providing said sheet with a second side having a nonadhesive surface opposite said first side;

providing at least a portion of said sheet of plastic material which is translucent for allowing light from a source at the rear of the aquarium to be transmitted through said portion;

providing an additional sheet of plastic material like said sheet, said additional sheet having a first side with a nonadhesive surface and an additional image means for being viewed at said first side thereof;

liberally applying additional clear liquid to said second side of said sheet;

installing said additional sheet with said first side of said additional sheet on said second side of said sheet with said additional image means thereof generally aligned with said portion of said sheet while initially entrapping said additional clear liquid therebetween;

squeegeeing said additional sheet toward said second side of said sheet to remove excess said additional clear liquid from between said second side of said sheet and said first side of said additional sheet while leaving some of said additional clear liquid therebetween; and said step of squeegeeing said additional sheet reduces a distance between said second side of said sheet and said first side of said additional sheet, causes said some of said additional clear liquid to fill any areas of greater separation between said second side of said sheet and said first side of said additional sheet, and causes said additional sheet to adhere to said second side of said sheet until being selectively removed by said additional sheet being separated from said second side of said sheet to allow said some of said additional clear liquid to escape from therebetween.

18. The method according to claim 16, further including, prior to said liberally applying said clear liquid to the outside surface of the rear glass and installing said sheet with said first side on the outside surface, the steps of:

providing a thin insert sheet of plastic material like said sheet with dimensions smaller than said sheet, said insert sheet having a first side and a second side having nonadhesive surfaces;

initially applying a small quantity of said clear liquid to said first side of said sheet;

installing said insert sheet with said second side of said insert sheet on said first side of said sheet while initially entrapping said small quantity of said clear liquid therebetween;

squeegeeing said insert sheet toward said first side to remove excess said small quantity of said clear liquid from between said second side of said insert sheet and said first side of said sheet to leave some quantity of said clear liquid therebetween; wherein said step of installing said sheet on the outside surface also entraps said insert sheet therebetween with said first side of said insert sheet toward the outside surface of the rear glass, prior to said squeegeeing of said sheet to cause said sheet to adhere to the outside surface.

19. The method according to claim 16, further including the step of providing said clear liquid which is at least one of water and petroleum jelly.

* * * * *